United States Patent [19]

Kress et al.

[11] 4,170,434
[45] Oct. 9, 1979

[54] LOAD HANDLING APPARATUS

[75] Inventors: Edward S. Kress, Brimfield; William L. LaBerdia, Pekin; Jackson C. Medley, Brimfield; Merrill E. Pinter, Kewanee, all of Ill.

[73] Assignee: Kress Corporation, Brimfield, Ill.

[21] Appl. No.: 861,537

[22] Filed: Dec. 19, 1977

[51] Int. Cl.² .............................................. B60P 3/00
[52] U.S. Cl. .................................. 414/459; 294/81 SF
[58] Field of Search ............... 214/392, 390, 394, 396, 214/658; 294/81 SF, 86 R

[56] References Cited

U.S. PATENT DOCUMENTS

| 2,583,075 | 1/1952 | Anderson et al. | 214/392 |
| 3,698,581 | 10/1972 | Goyarts | 214/394 |
| 3,744,652 | 7/1973 | Rieschel | 214/392 |

Primary Examiner—Albert J. Makay
Assistant Examiner—Edmond G. Rishell, Jr.
Attorney, Agent, or Firm—Leydig, Voit, Osann, Mayer & Holt Ltd.

[57] ABSTRACT

A load handling apparatus particularly suited for incorporation into a vehicle for lifting and transporting heavy loads such as steel slabs, comprising a main frame for straddling a load, pivoting lift frames to provide the lifting capacity of the apparatus, suspended load engaging and clamping members and hydraulic cylinders to actuate the lift frames and the load engaging and clamping members. In the illustrated embodiment, a control system is provided for the cylinders which includes provision for synchronously extending and retracting the lift cylinders and for accommodating any necessary adjustment of the length of the clamping cylinders as the load engaging and clamping members, with a load engaged and suspended therebetween, move transversely relative to the main frame, changing the distance between the points of connection of the cylinder.

10 Claims, 6 Drawing Figures

LOAD HANDLING APPARATUS

BRIEF SUMMARY OF THE INVENTION

This application relates generally to mechanisms for handling heavy loads and more particularly concerns improvements in vehicles for picking-up, supporting and carrying heavy loads.

For purposes of illustrations there is shown a vehicle for handling a load comprising steel slabs. It is contemplated that carriers of the type shown be able to carry a stack of such slabs having a weight on the order of 100-150 tons. While steel slabs are used herein as the load to be carried, it will be clear that the invention may be advantageously used to handle many varieties of loads whose size and weight normally present problems in handling and transporting.

An object of the invention is to provide an apparatus as referred to above which can pick up and otherwise handle loads of a range of sizes and regardless of whether the load is on a standard size bolster or pallet.

A further object is to provide an apparatus which may readily pick up and adjust an off center load.

Another object of the invention to provide an apparatus of the above character which safely handles a load, including in the event of a hydraulic failure or unequal loading of the system components.

It is also an object of the invention is to provide a vehicle incorporating an apparatus of the above kind and having a low carrying height while having the capability of lifting to and picking up from a high level.

Yet another object of the invention is to provide a vehicle of the above character providing a lifting mechanism with substantial flexibility in the size of the load being carried and the ability to manipulate the same while effectively restraining movement of the load relative to said vehicle due to accelerations, decelerations or impact loadings.

BRIEF DESCRIPTION OF THE DRAWINGS

Other objects and advantages of the invention will become apparent upon reading the following detailed description and upon reference to the drawings in which.

While the invention is susceptible of various modifications and alternative forms, a specific embodiment has been shown by way of example in the drawings and will hereinafter be described in detail. It should be understood, however, that it is not intended to limit the invention to the particular form disclosed, but to the contrary, this invention is to cover all modifications, equivalents and alternatives falling within the spirit and scope of the invention as expressed in the appended claims.

DETAILED DESCRIPTION

Turning to FIGS. 1-5, there is shown a vehicle 10 embodying the invention consisting of a trailer 11 coupled through a gooseneck 12 to a single axle prime mover 13 having an engine 14 and drive wheels 15. A pair of steering actuators 16 connected between the gooseneck 12 and the prime mover 13 facilitate the swinging of the prime mover from side to side relative to the trailer 11, thus giving the assembly a steering capability. An operators' cab 18 is shown mounted to the goose neck 12 of the trailer 11.

The trailer 11 includes a rigid, generally straddle-type main frame 19 defined by a cross beam 20 and a pair of rearwardly extending box-type support beams 21 and 22 connected at their rear portions by a stabilization link 24. The rear wheels 25 are mounted one each to the rear of the box beams 21 and 22. The configuration of the main frame 19 is such that the trailer 11 may be backed over a load to be handled. For the purposes of illustration, the load is illustrated as a bolster 26 upon which slabs of steel (depicted by way of phantom lines in FIG. 3) may be loaded for the transporting thereof.

According to the present invention, the main frame 19 carries a load lifting and carrying mechanism 28. The function of this mechanism is to handle a straddled load. As hereinafter described, the apparatus has the capacity of engaging the load and elevating it, either for a sorting and stacking operation or for maintaining ground clearance during a transporting operation. The load lifting and carrying mechansim 28 includes generally arch-shaped lift frame assemblies 29 and 30 pivotably mounted to the main frame 19 at longitudinally aligned positions. With this configuration, the cross beams of the lift frames 29 and 30 describe the paths indicated by the dotted lines in FIG. 1. Pivotally attached to and generally depending from the cross beams of the lift frame assemblies 29 and 30 are pairs of links 31 and 32. In accordance with the invention, the links 31 and 32 at each lateral side of the trailer support the front and rear ends of each side of load engaging and clamping members. While the configuration of these members might vary to accommodate the handling of specific loads, in the embodiment shown, the pairs of links 31 and 32 support rigid, longitudinally arranged, generally triangularly shaped members 34 and 35. These members serve the dual functions of engaging the underside of or "hooking", the load and laterally clamping thereagainst. To facilitate an understanding of the configuration of the members 34 and 35, the member 35 is illustrated in isolation in FIG. 5.

Figure 1:
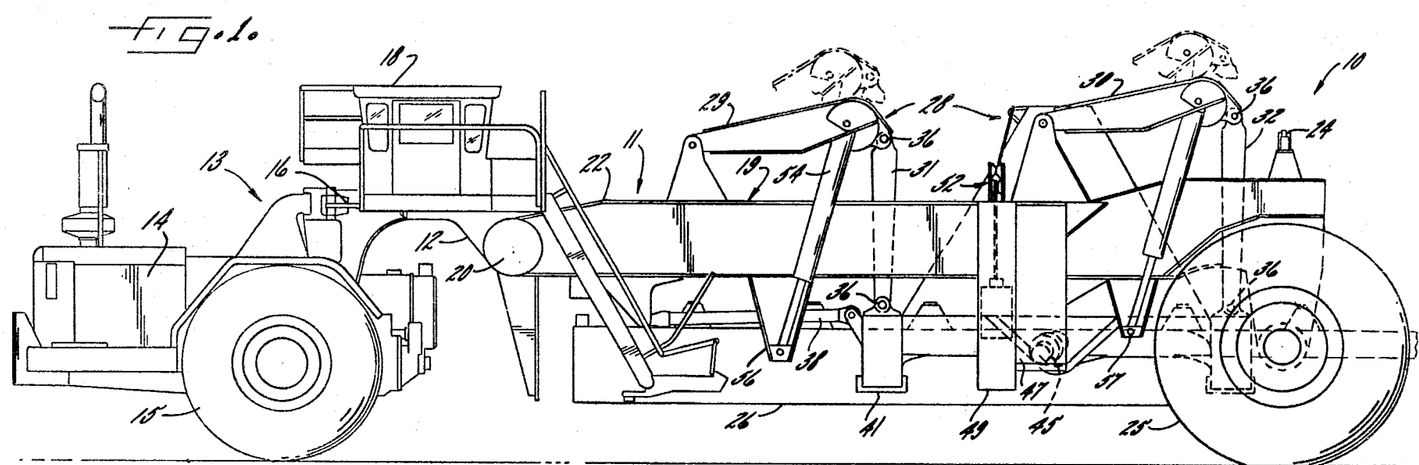
FIG. 1 is an overall side elevation of a vehicle according to the present invention for carrying heavy loads such as steel slabs.
Figure 2:
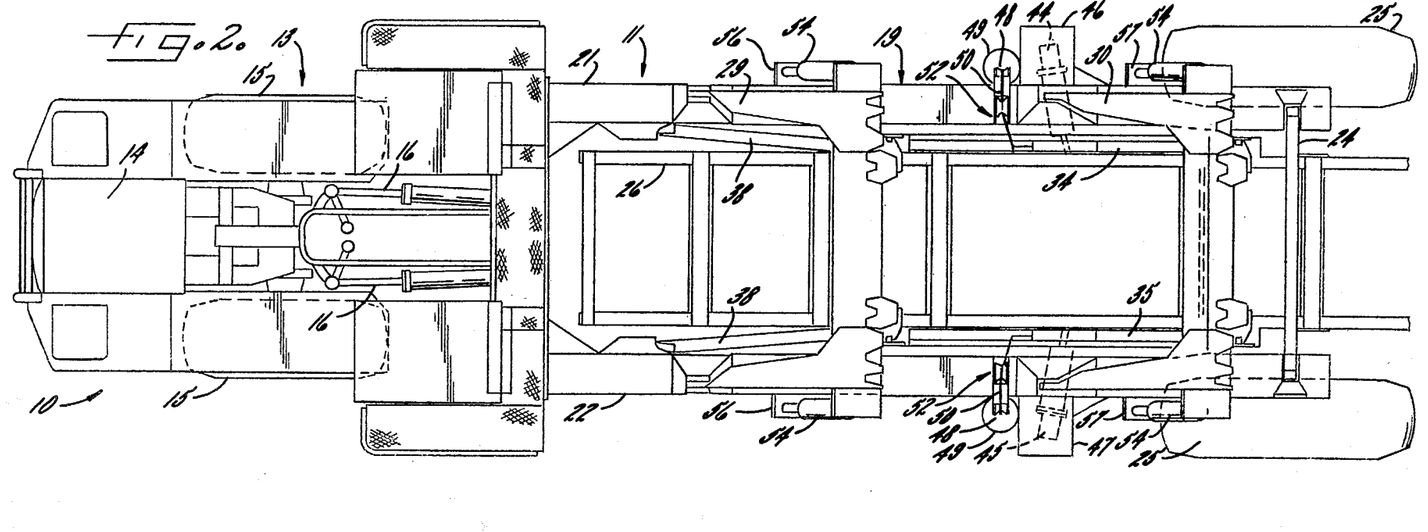
FIG. 2 is an overall plan view of the vehicle shown in FIG. 1.
Figures 3, 4, 5:
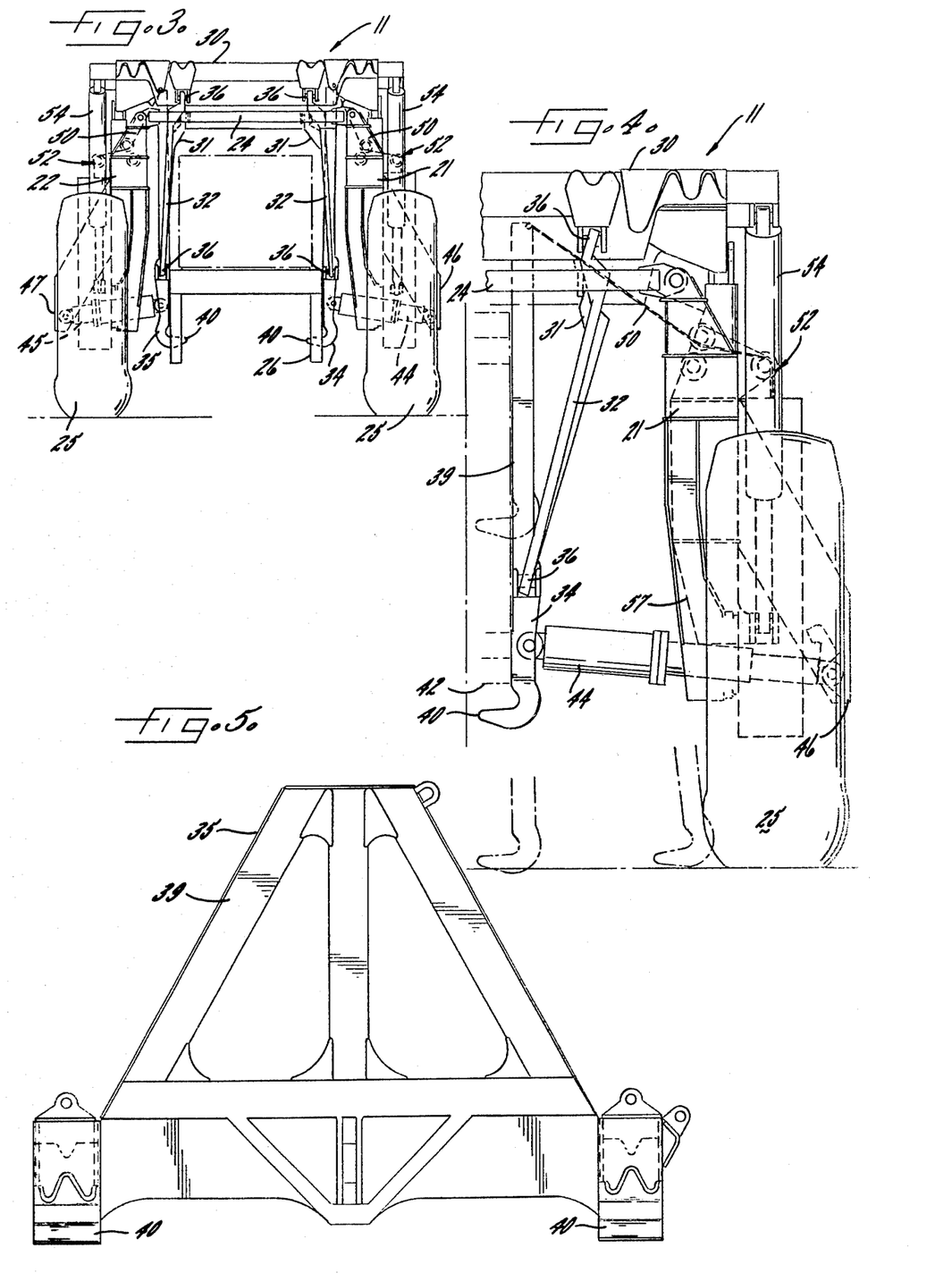
FIG. 3 is a rear elevational view of the vehicle illustrated in FIGS. 1 and 2.
FIG. 4 is an fragmentary rear elevational view illustrating the clamping and lifting mechanism in several positions.
FIG. 5 is a side view of one of the combination hook and clamp members utilized in the embodiment illustrated in FIGS. 1-4.

In keeping with the invention, combination pivots and spherical bearings 36 provide for a high degree of freedom in the relative movement between the lift frames 29 and 30, the pairs of links 31 and 32, and the hooks 34 and 35. This arrangement permits the links 31 and 32, with the hooks 34 and 35 attached thereto, to hang substantially vertically, as viewed in FIG. 1, throughout the travel of the lift frames 29 and 30. In addition, each of the hooks 34 and 35 may be positioned laterally (as viewed in FIGS. 3 and 4) relative to the main frame 19. This latter capability allows for the gripping and releasing of the particular load, and is particularly advantageous in facilitating the handling of loads of a variety of widths. Dotted lines in FIG. 4 illustrate the range of lateral movement provided according to the present invention.

According to an aspect of the invention, the front-to-back movement of the links 31 and 32 and the hooks 34 and 35 is restrained through the action of the drag links 38. These drag links 38 are pivotally and spherically connected between the frame 19 and the hooks 34 and 35 and are designed to prevent free swinging of the hooks which would otherwise be possible. With this arrangement, relative movement between the hooks 34 and 35 and the frame 19 is minimized, providing stability during accelerations and decelerations, while cornering, and in the event of impact loadings.

Turning to a more detailed consideration of the combination hook and clamp members 34 and 35 illustrated and the mounting and the control thereof, the members have a substantially planer inner clamping surface 39 with inwardly extending portions 40 at the front and rear of the members at the lower edges thereof which engage the load for lifting. The specific configuration of the portions 40 depends upon the type of the load to be carried and the configuration of the bolster, if any, to be used with the load. In the embodiment shown, the portions 40 are adapted to fit into openings 41 in the sides of bolster 26 upon which slabs of steel (shown in phantom in FIG. 3) may be loaded to facilitate the transporting thereof. The same or a similar configuration may also be employed to engage the underside of steel slabs directly, eliminating the need for a bolster 26, provided a space is maintained beneath the lateral edges of the lower slab and the surface upon which it rests to permit the insertion of the portions 40. The present invention is particularly advantageous in such an application since, as explained above, the combination hook and clamp members may be laterally positioned, as illustrated in FIG. 4 to cause the inner clamping surfaces 39 to engage the load directly (see the phantomed load 42 in FIG. 4).

In keeping with the present invention, means are provided for controlling the lateral positions of the hooks 34 and 35. Actuators, illustrated in the drawings as cylinders 44 and 45, are pivotally and spherically connected between downwardly extending portions 46 and 47 of the main frame 19 and the hooks 34 and 35. The cylinders 44 and 45, two-stage telescopic cylinders, provide for maximum compactability, thereby minimizing the overall width of the trailer 11, while still providing a sufficient stroke to handle loads having considerable variation in width.

The points of connection of the cylinders 44 and 45 (hereafter sometimes referred to as "clamping cylinders") to the main frame 19 and the hooks 34 and 35, are chosen in an effort to optimize the application of the actuating force of the cylinders. In this regard, referring to FIGS. 1 and 4, it will be appreciated that as the lift frames 29 and 30 are raised from their lowermost position to a more elevated position, the cylinders 44 and 45 each will sweep out a partial conical surface, with the points of connection of the cylinders to the extensions 46 and 47 of the main frame 19 as the apexes. The cone angles of the swept surfaces depends upon the state of extension of the cylinders 44 and 45. Incidentally, it should be noted that in the embodiment shown, the cylinders 44 and 45 are mounted to the combination hook and clamp members 34 and 35 between the points of connection of the links 31 and 32 to said members, as well as between the hook portions 40 of the members. This arrangement permits the lifting mechanism 28, as a whole, to be substantially self-aligning with the load, and, further, tends to keep the inside surfaces of the combination hook and clamp members tightly engaged against the load to reduce the possibility of accidentally dropping the load during the lifting and transporting operations.

In view of the fact that the links 31 and 32, as well as the cylinders 44 and 45 are connected to lower portions of the combination hook and clamp members 34 and 35, provision is required to stabilize the members in a substantially upright position, especially in the no load condition. In order to provide such stabilization, biasing means are provided to retain the hooks 34 and 35 substantially upright. The biasing means must not only remain effective throughout the lifting and lowering movements of the hooks 34 and 35, but must also remain effective throughout the lateral movements thereof in response to the actuation of the cylinders 44 and 45. In order to maintain such substantially constant biasing forces at the upper portions of the combination hook and clamp members 34 and 35, dead weights 48 are provided in vertical tubular guides 49. Flexible force transmission means, shown as cables 50 in the embodiment illustrated, interconnect the dead weights 48 with the upper portions of the hooks 34 and 35. A system of pulleys, indicated generally at 52, directs the cables 50 from the vertical paths required to accommodate the travel of the dead weights 48 to the varying positions of the upper portions of the hooks 34 and 35.

Turning now to a consideration of the system for raising and lowering the lift frames 29 and 30, actuators are connected between the main frame 19 and the lift frames. In the embodiment shown, the actuators are four identical hydraulic cylinders 54. The cylinders 54 associated with lift frame 29 have one end pivotally connected to extending portions 56 of the main frame 19 and their other ends pivotally connected to the lift frame. The cylinders associated with lift frame 30 are similarly connected between extending portions 57 of the main frame 19 and the lift frame. With the arrangement shown, the extension and retraction of the cylinders 54 pivot lift frames 29 and 30 between a lowermost position wherein they rest on the support beams 21 and 22 and an elevated position shown by way of dotted lines in FIG. 1. It will be appreciated that the sizing of the cylinders 54 as well as their specific points of attachment to the main frame 19 and the lift frames 29 and 30 are dependent upon many factors, including, among others, the contemplated sizes of the loads, the weights thereof, and the required lifting height.

In keeping with an aspect of the invention, it will be appreciated that the height of the trailer portion 11 of the vehicle 10 is a minimum with the lift frames 29 and 30 resting on the support beams, with the cylinders 54 retracted, and a maximum with the lift frames in their elevated positions, with the cylinders fully extended. This feature of the invention has the advantage of providing a high lifting capability for sorting, stacking, etc, while permitting a low overall height during the transporting operation, when doors and other structures might impose maximum height limitations.

While the requirements that the cylinders 44 and 45 extend to engage a load and retract to release it, and that the lift cylinders 54 extend to lift a load and retract to lower it are, without more, relatively straightforward ones, it will be appreciated, that, especially when handling loads of on the order of 100 tons or more, care must be taken to assure that the load is securely gripped as it is being handled and transported to prevent the inadvertent shifting or dropping of the load.

Further, it is desirable that provision be made to compensate for an uneven distribution of the load on the lifting cylinders 54 in order to prevent the twisting or warping of the load or even of the trailer 11 itself, or its subassemblies, e.q. the lift frames 29 and 30.

In addition, some more specialized operations beyond the routine gripping, lifting, lowering and releasing sequence of operations may be desirable or even necessary in certain situations. For example, it may be desirable to actuate the cylinders 44 and 45 simultaneously and symmetrically at some times and individually and/or asymmetrically at other times. An example of this latter situation would be in the side-shifting of a load to correct a misalignment thereof with the trailer 11 prior to a transporting operation.

Also, as explained in more detail below, the geometry of the apparatus according to the present invention is such that special provision must be made to assure that the general functions are reliably and dependably carried out.

Finally, provision must be made to ameliorate the effects of other contingencies, such as the unexpected failure of all or a portion of the control system.

Figure 6:
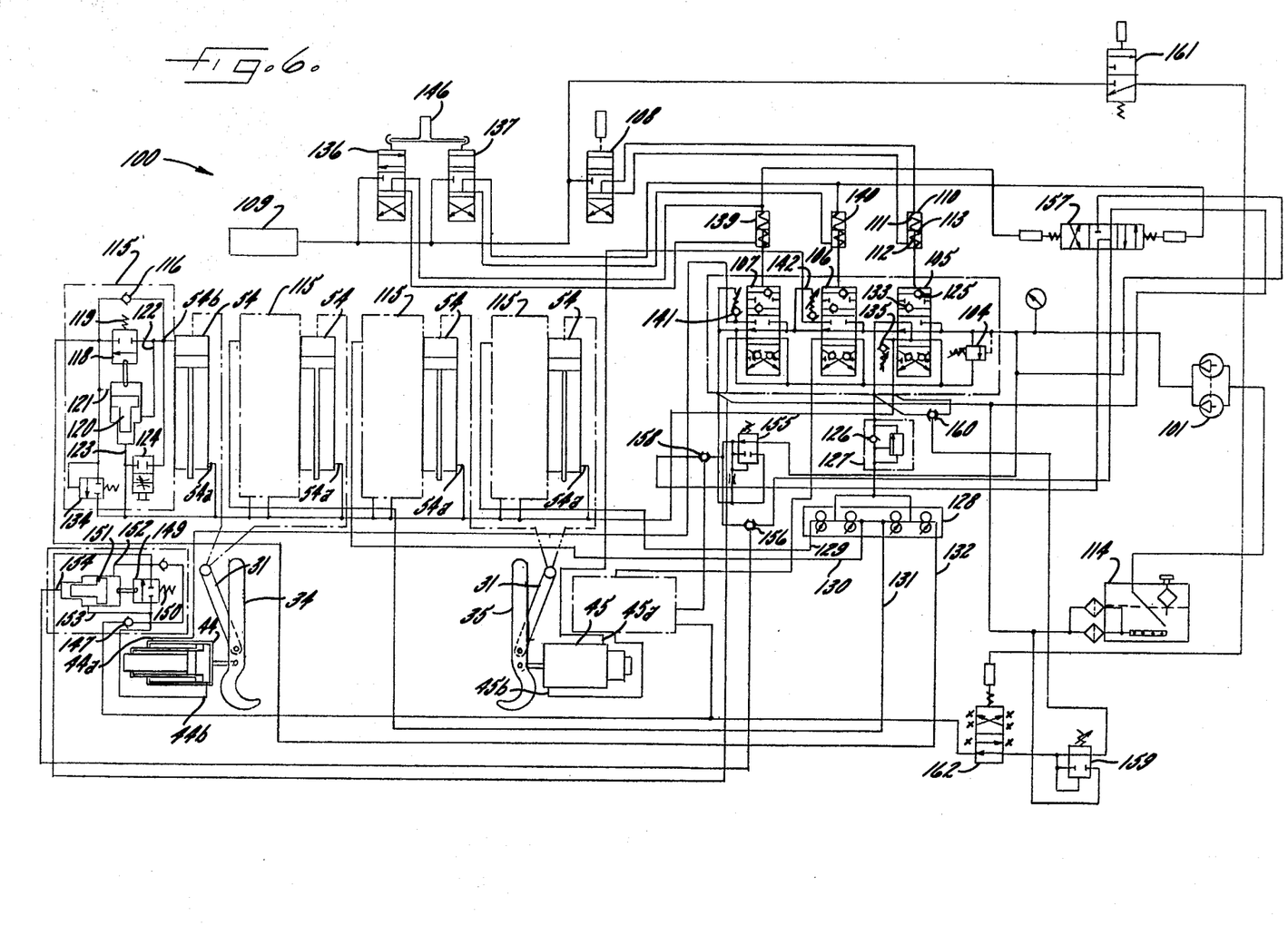
FIG. 6 is a schematic of a pneumatic and hydraulic system which may be advantageously employed with the embodiment of the invention illustrated in FIGS. 1-5.

In view of these considerations, the design according to the present invention can be most advantageously utilized when employed in connection with a specialized control system, as, for example, the control system 100 illustrated by way of schematic in FIG. 6. Generally, this control system comprises manually operated pneumatic controls to selectively actuate the hydraulic cylinders and supporting hydraulic components.

Considering the control system 100 in detail, a hydraulic pump 101 delivers hydraulic fluid for the operation of the hydraulic system, which operation consists essentially of actuating the two cylinders 44 and 45, the lift frame actuating cylinders 54 and the internal system components hereinafter described. The pump output is directed into a valve block 102. Within this valve block 102, relief valve 104 limits system pressure. Three-position spool valves 105, 106 and 107 control the operation of the lift cylinders 54, the clamping cylinder 45, and the clamping cylinder 44, respectively.

The functioning of the various components of the control system 100 in the several operating modes may be most readily understood by describing the operation of the components under specific conditions. As hereinafter explained, certain aspects of the control of the clamping cylinders 44 and 45 are dependent upon the status of the operation of the lift cylinders 54. Accordingly, the lifting and lowering operations will first be explained based on the assumption that the clamping cylinders 44 and 45 have been extended to engage a load and support it throughout the described lifting and lowering operations. Following the explanation of the operations of the lift cylinders 54, the interdependent operation of the clamping cylinders 44 and 45 will then be explained.

A manually operated pneumatic spool valve 108 serves to selectively apply pressurized air from a pneumatic reservoir 109 to a feathering cylinder 110 which actuates the hydraulic spool valve 105. With the pneumatic spool valve 108 in the position shown in FIG. 6, both pneumatic lines of the feathering cylinder 110 are exhausted to atmosphere, with the result that the springs 111 and 112 maintain the feathering cylinder piston 113 at its central or neutral position illustrated in FIG. 6. In this state, the spool valve 105 is in its neutral position with its central ports being active. Hydraulic fluid from the pump 101 is simply passed through the spool valve 105 and made available to the subsequent spool valves 106 and 107. The ports 54a of the lift cylinders are connected through the spool valve 105 and the internal circuitry of the valve block 102 to the tank 114. The other lines to the lift cylinders are also ultimately connected to the tank 114 through the spool valve 105 with this valve in the position shown in FIG. 6, though interposed system components prevent the unrestricted continued flow of fluid from the ports 54b.

Triple pilot overcenter valves 115, shown schematically in FIG. 6, are connected directly to the ports 54b of the lift cylinders. These valves serve to assure that hydraulic fluid is released from the ports 54b of the lift cylinders, allowing the cylinders to retract, only under cetain circumstances. By so controlling the flow of fluid from the cylinders, the objectives of a synchronous retraction of the cylinders despite unequal loading, the prevention of an unexpected retraction of one or more of the cylinders due to a failure of part or all of the hydraulic system, as well as other benefits hereinafter described, can be achieved.

Referring to the internal schematic representation of one of the overcenter valves 115, a check valve 116 prevents the unrestrained flow of fluid from the port 54b of the lift cylinder to which the overcenter valve is connected. A spool 118 provides a selective exit path for the fluid. This spool 118 is biased closed by a spring 119, and, additionally, is subject to the force exerted by the piston 120. The net force exerted by the piston 120 is the algebraic sum of the forces exerted thereon by hydraulic fluid in the three pilot lines 121, 122 and 123. In the event the force exerted by the piston 120 on the spool 118 is sufficient to overcome the force exerted by the spring 119, the spool will shift, providing an exit path for the fluid in communication with port 54b of the lift cylinder.

It will be appreciated that the geometry of the piston 120, the force exerted by the spring 119 and the fluid pressures in the pilot lines 121, 122 and 123 will determine the status of the overcenter valve 115 during the course of the system operation. For the purposes of illustration of the operation of the valves 115, therefore, as well as for the operation of the remainder of the system, values will be assigned to various parameters of the overcenter valves 115, the expected system loadings, parameters of other overcenter valves, and relief and pressure reducing valve settings throughout the system to facilitate an understanding of the operation of the complete system. It should be appreciated that when numerical values are assigned, they are for the purposes of illustration of a particular embodiment only and may be adapted to satisfy the requirements of other particular application without deviating from the spirit and scope of the present invention.

To illustrate the operation of the overcenter valve, it will be assumed that the spring 119 exerts a constant 2500 pound (lb) force throughout the range of its operation. The areas of the piston 120 in communication with the pilot lines 121, 122 and 123 are assumed to be 11 square inches (sq. in.), 1 sq. in. and 10 sq. in., respectively. The maximum of the fluid in communication with port 54b of the lift cylinder under maximum loading conditions is assumed to be about 2000 pounds per square inch gage pressure (hereinafter simply psi). The tank pressure is assumed to be maintained at or near zero psi. Based on this information, it is apparent that fluid will not be permitted to pass through the spool 120 of overcenter valve 115 at any time when the hydraulic spool valve 105 is in the position indicated in FIG. 6. Even under maximum loading, a fluid pressure of 2000 psi in pilot line 122, acting on the 1 sq. in. of surface of piston of 120, is insufficient to overcome the 2500 lb force of the spring 119 regardless of the pressure within pilot line 121. As already noted, the pressure of the hydraulic fluid in flow communication with port 54a of the lift cylinder is at tank pressure, with the result that no force is exerted on the piston 120 by the fluid in pilot line 123.

Incidentally, should there be a need to manually release fluid from one or more of the cylinders 54, as in the case of lowering a load at a time when the pneumatic and/or hydraulic systems are inoperative, manually operable "bleed" valves 124 are provided within the overcenter valves 115 to meter the fluid out of the lift cylinders.

Manually actuating pneumatic spool valve 108 to activate the upper ports thereof will apply the pressure from pneumatic reservoir 109 to the upper port of feathering cylinder 110, overcoming the spring 112 and causing the upper ports of hydraulic spool valve 105 to be activated. In this state, fluid at pump pressure will be applied through a check valve 125 within the spool valve 105, through a check valve 126 within a back pressure valve 127 and through a flow divider 128 from which lines 129, 130, 131 and 132 extend, one each of these lines connecting to the four overcenter valves 115 described above. Within the overcenter valves 115, the pump pressure will be applied through the check valves 116 and into the ports 54b. In this mode of operation, the ports 54a are open to the tank 114 through the check valve 133 within the spool valve 105. As a result, the pressurized fluid at the ports 54b will flow into the cylinders 54, expelling the fluid from the ports 54a, causing the cylinders to extend.

The pressure of the hydraulic fluid within the cylinders 54 may vary from one cylinder to the next depending upon the load the particular cylinder is bearing. The flow divider 128 will assure that flow into each of the cylinders 54 is substantially equal despite variations in the pressure therein due to unequal load distribution. In keeping with an aspect of the invention, this arrangement results in an equal rate of extension of the cylinders. Once the cylinders 54 reach the desired state of extension, the pneumatic spool valve 108 may be returned to the position illustrated in FIG. 6, allowing the feathering cylinder 110 and the hydraulic spool valve 105 to resume their positions. As explained above, the overcenter valves 115 will maintain the particular state of extension of the cylinders at the time the spool valve 105 is returned to its neutral position.

Incidentally, should one or more of the cylinders 54 reach its fully extended position and "bottom out" during the extending operating explained above, pressure relief valves 134 within the overcenter valves 115 provide a path back to the tank 114 for the particular cylinder's share of hydraulic fluid from the flow divider 128.

In order to allow the cylinders 54 to retract, lowering the load, the pneumatic spool valve 108 may be manually displaced upward, actuating the lower ports thereof. As a result, the feathering cylinder 110, and, in turn, the hydraulic spool valve 105 will be deflected upward, actuating the lower ports of the latter. In this mode of operation, the pressurized hydraulic fluid from the pump 101, subject to the relief valve 135, will be applied directly to ports 54a. Referring again to the internal schematic of one of the overcenter valves 115, the relief pressure of valve 135 will also be present in the pilot line 123. Simultaneously, the pressure at port 54b will be applied to pilot line 122. As already noted above, the pressure at the port 54b of the four cylinders 54 will vary depending upon the loads supported by each of the cylinders. The pressures in each of the pilot lines corresponding to lines 122 and 123 in the valve illustrated will result in forces on the counterparts of piston 120, tending to shift the spools (item 118 in the detailed schematic) against the bias of the springs (item 119) and the forces exerted by the fluid pressure in the pilot lines corresponding to line 121. This latter force will vary from one overcenter valve 115 to the next depending upon the pressure within the lines 129-132. Pressure is present in these lines as a result of the pressure multiplying effect of the flow divider 128 as it is driven against the back pressure generated by the valve 127. This arrangement assures that the cylinders 54 will retract substantially synchronously despite unequal load distribution.

Explaining more fully the operation of the system in this mode of operation, with the back pressure valve 127 set to maintain, for example, 50 psi between itself and the flow divider 128. With no flow through any of the lines 129-132, the pressures therein will be substantially equal at about 50 psi. Using the exemplary values assumed above in describing the operation of the overcenter valves 115, the total downward (as viewed in FIG. 6) forces on the spool 118 will be 3050 lbs (2500 lbs+(50 psi×11 sq. in.)=3050 lbs). As soon as the total upward force on the spool 118 (upward force=pilot line 122 pressure×1 sq. in.+pilot line 123 pressure×10 sq. in.) exceeds this value, the spool will be shifted into its open position. With equal loading of the cylinders 54, this will happen at the same time for all four overcenter valves 115. In the event, however, that the cylinders 54 are not equally loaded, without more, the more heavily loaded cylinder (s) would begin retracting sooner, and furthermore, would tend to retract at a higher rate. The system illustrated in FIG. 6 reduces or eliminates this undesirable effect.

Assuming, as before, that the pressures in lines 129-132 are equal at about 50 psi in a no flow condition, the spool 118 within the overcenter valve 115 of the heaviest loaded cylinder 54 will open first to permit flow out of port 54b. In this event, as a result of the flow divider 128, the pressure in the particular line will rise significantly. Simultaneously, the pressure in the other lines not yet experiencing flow will drop. In view of these pressure changes, the previously opened spool might close, and one or more of the remaining spools will open. Such interaction will result in the system reaching its own equilibrium and uniformly lowering the load.

Turning now to an analysis of the operation of the clamping cylinders 44 and 45, manually actuated pneumatic spool valves 136 and 137 control feathering cylinders 139 and 140 which, in turn, set the positions of the hydraulic spool valves 107 and 106, respectively. With the pneumatic spool valves 136 and 137 in their neutral positions, the feathering valves 139 and 140 are in their equlibrium positions, such that hydraulic spool valves 107 and 106 are in their neutral positions with their central ports being active, as shown in FIG. 6. The ports 44a and 45a of the cylinders 44 and 45 are connected through relief valves 141 and 142 respectively to the tank 114. The other lines from the cylinders 44 and 45 are similarly connected through the spool valves 107 and 106 to the tank 114, but, as was the case with the lift cylinders 54, provision is made to prevent the unrestricted flow of fluid from ports 44b and 45b.

The ports 44b and 45b of the cylinders 44 and 45 are connected through triple pilot overcenter valves 144 and 145, respectively. The overcenter valves 144 and 145 are identical to one another and similar in form and operation to the valves 115 above. The former have an additional inlet and check valve, while not having an internal relief valve, or manually operated bleed valves (items 134 and 124, respectively, in valves 115). Generally, the overcenter valve 144 can admit fluid into the port 44b through check valves 147 and 148 within the overcenter valve. In order for hydraulic fluid to be expelled from the port 44b, however, the only possible exit route is through the spool valve 149 within the overcenter valve, which is biased closed by a spring 150. The spool valve 149 is shown schematically as additionally being subject to the force exerted by the piston 151. The net force on the piston 151 the algebraic sum of the forces exerted thereon by the fluid supplied thereto through the three pilot lines 152, 153 and 154.

While independent from one another, the control of cylinder 44 is identical to the control of cylinder 45. Accordingly, in most of the discussion which follows, though only the control of cylinder 44 may be expressly discussed, it will be understood that cylinder 45 can be controlled in the same manner. In this regard it should be noted that a manual control 146 may selectively control either or both of the pneumatic spool valves 136 and 137, which control hydraulic spool valves 107 and 106, respectively.

With the spool valve 107 in the neutral position illustrated in FIG. 6, the pressure in pilot line 152 is essentially that of the tank 114. The pressure in the pilot line 154 will be that of the output of the pressure reducing valve 156, the input of which is at the pressure from the pump 101. The reduced pressure output of valve 155 is transmitted to a shuttle valve 156. With pneumatic spool valve 137 in the neutral position shown in FIG. 6, the spool valve 157 controlled thereby is also in the neutral position, with the result that the tank pressure is applied to the opposite port of the shuttle valve 156. Accordingly, the output pressure of the reducing valve 155 is applied through the shuttle valve 156 to the pilot line 154. It should be noted that an identical system employing a shuttle valve 158 is provided for clamping cylinder 45. The pressure in the pilot line 153 depends on the status of other system components, which may vary from operation to operation, e.g., lifting with a clamped load, lifting with no load, lowering with a clamped load and lowering with no load. These modes of operation are described below.

In the case of lifting with the combination hook and clamp members 34 and 35 clamped against a bolster 26 and with the cylinder 54 initially retracted such that the points of connection of the cylinders 44 and 45 to the members 34 and 35 are lower than the points of connection of these cylinders to the extensions 46 and 47 of the main frame 19, it will be appreciated from FIG. 4 that provision must be made to allow the cylinders 44 and 45 to retract until they reach a minimum length (approximately when they are horizontally oriented), at which point, upon further lifting, the cylinders must extend to prevent the members 34 and 35 from pulling away from the load and possibly dropping it. Considering first the necessary retraction of the cylinder 44 (the operation of the cylinder 45 is identical in this mode), the pressure at port 44b and consequently, at pilot line 153, will rise as the lifting of the load from the ground level commences. This pressure rise will ultimately result in the opening of the spool 149 within the overcenter valve 144, allowing the cylinder to undergo the necessary retraction.

Illustrating the operation of the overcenter valve 144 in this mode of operation, it will be assumed that the spring 150 exerts a constant force of 5000 lbs. throughout its range of operation. The areas of the piston upon which the fluid from the pilot lines 152, 153 and 154 act are assumed to be 11 sq. in., 1 sq. in. and 10 sq. in., respectively. Assuming the pressure relief valve 155 is set at 375 psi, the pressure in pilot line 153 necessary to cause the spool valve 149 to shift, allowing fluid to exit from port 44b and permit the retraction of the cylinder 44, is 1250 psi 15000 lbs.$-(375 \text{ psi} \times 10 \text{ sq. in}) \div 1$ sq. in.$=1250$ psi). Depending upon the size of the cylinder 44, this force should be adequate to maintain a good clamping relationship during the operation. Incidentally, it should be noted that fluid cannot freely enter the port 44a of cylinder 44 to fill the increased volume resulting from the expulsion of fluid from 44b due to the action of relief valve 141. Accordingly, during this phase of the operation, the fluid in communication with port 44a will be at a suction pressure.

As the clamping cylinders 44 and 45 are raised above the horizontal while clamping a load, as explained above, without more, the clamps 34 and 35 would tend to pull away from the load, possibly dropping it. Provision is made in the system illustrated to provide adequate clamping during this operation through the use of valves 159, 160, 161 and 162. Valve 159 is a pressure reducing valve, the input of which is the output of a shuttle valve 160. When the spool valve 105 is in either its lifting or lowering state, with the ports other than the neutral ones activated, the pump pressure will be applied through the shuttle valve 160 to the input of the pressure reducing valve 159. The output of the pressure reducing valve 159 will, in the absence of a manual input to pneumatic control valve 161, be transmitted through pneumatically-actuated spool valve 162 to the overcenter valve 144. Within the overcenter valve 144, the hydraulic fluid at the output pressure of the pressure reducing valve 159 will be transmitted through check valve 147 and into port 44b of the cylinder 44 to provide a supply of fluid and a clamping force to maintain a secure clamping relationship between the clamp 34 and the load. Using the exemplary values from above, the pressure reducing valve 159 should have an output pressure of somewhat less than 1250 psi to assure that the spool 149 does not shift during this operation. The output of the pressure reducing valve 159 is similarly provided to the overcenter valve 145 to effect the similar operation of cylinder 45 in activating clamp 35.

Turning to a consideration of a lowering operation with a load, starting at a position wherein the points of connection of the cylinders 44 and 45 to the hook and clamp members 34 and 35 are above the points of connection to these cylinders to the main frame 19, the cylinders must first retract until they reach a horizontal position and then extend once the cylinders pass through the horizontal plane. The system operation in this mode is identical to that explained above for the retraction and subsequent lengthening of the cylinders 44 and 45 during lifting with a load.

It may be necessary to lift or lower the hook and clamp members 34 and 35 with no load clamped therebetween. In such case, it may be desirable to overcome the tendency for the cylinders 44 and 45 to lengthen as a result of the output of pressure reducing valve 159, explained above. The extension of the cylinders during a lifting without a load operation may be suppressed by providing a manual input to a pneumatic control valve 161, which will shift the spool of valve 162, blocking the flow of fluid from the pressure reducing valve 159 to the overcenter valves 144 and 145. (In FIG. 6, the X's at several of the ports of valve 162 represent plugs therein.)

The discussion above pertains to the operation of the cylinders 44 and 45 during various lifting and lowering operations. Several modes of operation of the cylinders 44 and 45 alone, i.e., in the absence of lifting or lowering through the activation of cylinder 54, are possible with the system illustrated in FIG. 6. Among these operations are the basic ones of extending the cylinders 44 and 45 to clamp a load, retracting the cylinders to release a load and side-shifting a load by extending one and contracting the other of the cylinders. These operations are hereinafter discussed. Throughout the discussion below, it is assumed that the lifting and lowering spool valve 105 is in its neutral state as illustrated in FIG. 6. As a result, both inputs to the shuttle valve 160 are at tank pressure, such that both the input to and the output from the pressure reducing valve 159 are also at tank pressure. Accordingly, regardless of the status of the control valve 162, check valve 147 in overcenter valve 144 (as well as the equivalent valve, not shown, in overcenter valve 145) will be closed.

Considering the extension of cylinder 44 in the absence of a lifting and lowering operation, moving the manual control 146 to shift the spool of valve 137 upward will, through the action of feathering cylinder 139, activate the lower parts of the spool valve 107. With valve 107 in this mode, pressurized fluid from the pump 101 will enter valve 144, pass through check valve 148 and into port 44b of cylinder 44. Simultaneously, port 44a is connected directly to the tank 144, with the result that the cylinder 44 will extend until it contacts a load (or otherwise "bottoms out"), at which time the fluid causing the cylinder to extend can rise to full pump pressure, providing a substantial load clamping capability.

Once the cylinder 44 is clamped, the spool valve 107 may be allowed to return to its neutral position. In the absence of a simultaneous lifting or lowering operation, the cylinder 44 will remain extended and clamped, with the fluid in communication with port 44b being confined by the check valves 147 and 148 and the spool valve 149 within overcenter valve 144. Since the pump 101 is not caused to pump against any load, its output will drop to merely that required to overcome system losses, with the result that the pressure in pilot line 154 of overcenter valve 144 (and the corresponding pressure in overcenter valve 145) will be substantially equal to the pressure of tank 114. Even though the pressure in pilot line 152 is also substantially tank pressure, and the pressure in pilot line 153 is the residual clamping pressure (which could be up to full pump pressure—2500 psi in the exemplary system) the net force on the piston 151 cannot overcome the 5000 lb. spring force and allow spool valve 149 to open. Accordingly the cylinder 44 (and also, by the same analysis, cylinder 45) cannot inadvertently pull away from the load.

To retract cylinder 44 in the absence of a lifting or loading operation, the spool valve 107 is shifted via manual control 146 to activate its upper ports. Fluid at relief valve 141 pressure will be provided to port 44a. Pilot line 152 of overcenter valve 144 will be at substantially tank pressure, and pilot line 153 will be at the residual damping pressure. Explaining the subcircuit which supplies sufficient pressure at pilot line 154 to permit the opening of the spool valve 149 within overcenter valve 144 and allow the cylinder 44 to be retracted, pneumatically-actuated hydraulic spool valve 157 is provided to selectively apply pump pressure to shuttle valve 156 when spool valve 136 is moved to the "retract" position, pneumatically pressurizing the left input to valve 157. Shuttle 156 in turn transmits the pump pressure to the overcenter valve 144 to shift the spool 149, allowing the cylinder to retract. Similarly, the spool valve 157 may selectively apply pump pressure to shuttle valve 158 upon the shifting of spool valve 137 into the "retract" position, pneumatically pressurizing the right input to valve 157 to permit the application of pump pressure to overcenter valve 145.

An additional operation which might be necessary is the side-shifting of a load once it has been lifted free of the ground in order to center it or otherwise to selectively position it between the support beams 21 and 22. To accomplish this, it is simply necessary to place the cylinder which is to do the "pushing" in the clamping mode, described above. With regard to the cylinder which is being "squeezed", the system will operate in the same manner as when the cylinder is forced to retract while lifting a load from the ground to a horizontal cylinder position, also described above.

We claim:

1. A load handling apparatus comprising, in combination:
    a main frame comprising a pair of support beams arranged substantially parallel and spaced apart from one another by an amount sufficient to straddle the load to be handled;
    a pair of lift frames, each of said lift frames being pivotally mounted to said support beams to span the space therebetween, said lift frames being movable between a lowered position in which portions of said lift frames may rest on said support beams and a raised position in which said portions of said lift frames are pivoted up and away from said support beams, the difference in elevation of said lift frame portions relative to said main frame between said lowered and raised positions providing the lifting capability of said lift frames;
    a pair of load engaging and clamping members;
    two pair of links, each pair of links being flexibly mounted to said portion of one of said lift frames to hang between said support beams, one link from each pair of links flexibly supporting one of said load engaging and clamping members adjacent and substantially parallel to one of said support beams, the other link from each pair of links flexibly supporting the other of said load engaging and clamping members adjacent and substantially parallel to the other of said support beams;
    first means for actuating said lift frames to raise and lower said links and said load engaging and clamping members relative to said main frame; and, second means for actuating said load engaging and clamping members to move said members toward and away from one another to engage and release a load straddled by said main frame.

2. A load handling apparatus as set forth in claim 1 wherein said first and second means comprise hydraulic cylinders and control means for the operation thereof.

3. A load handling apparatus as set forth in claim 2 wherein said first means comprises at least one hydraulic cylinder connected between each of said lift frames and each of said support beams and said control means includes means for substantially synchronizing the operation of said cylinders to coordinate the extension and retraction thereof despite unequal loadings of said cylinders.

4. A load handling apparatus as set forth in claim 2 wherein said second means comprises at least one hydraulic cylinder connected between each of said load engaging and clamping members and the adjacent support beam and said control means includes means for automatically accommodating any necessary adjustment of the length of said cylinders as said members, with a load engaged and supported therebetween, move transversely relative to said support beams, changing the distance between the points of connection of the cylinders.

5. A load handling apparatus as set forth in claim 1 wherein the point of attachment of said links to said load engaging and clamping members is at the lower portion of said members to minimize the deviation of said links from the vertical during the operation of said second actuating means.

6. A load handling apparatus as set forth in claim 5 further comprising means for biasing the upper portion of said load engaging and clamping members away from said space between said support beams.

7. A load handling apparatus as set forth in claim 6, said biasing means comprising a dead weight connected by a flexible force transmission means to said upper portion of each said load engaging and clamping members, said dead weights applying substantially constant biasing force throughout the travel of said members.

8. The load handling apparatus of claim 1 wherein said main frame is incorporated into a vehicle for lifting and transporting loads.

9. The load handling apparatus of claim 8, said vehicle further comprising drag links connecting said main frame and said load engaging and clamping members to restrict the relative movement therebetween arising from accelerations, decelerations and input loadings of the vehicle.

10. A load handling apparatus as set forth in claim 8, the means for actuating said load engaging and clamping members toward and away from one another being a multi-stage telescopic cylinder connected between each of said load engaging and clamping members and the adjacent support beam to minimize the overall width of said vehicle.

* * * * *